United States Patent
Sun

(10) Patent No.: US 9,880,337 B2
(45) Date of Patent: Jan. 30, 2018

(54) OPTICAL FIBER ASSEMBLY, METHODS OF MANUFACTURE THEREOF AND ARTICLES COMPRISING THE SAME

(71) Applicant: OFS Fitel, LLC, Norcross, GA (US)

(72) Inventor: Xiaoguang Sun, West Hartford, CT (US)

(73) Assignee: OFS FITEL, LLC, Norcross, GA (US)

( * ) Notice: Subject to any disclaimer, the term of this patent is extended or adjusted under 35 U.S.C. 154(b) by 334 days.

(21) Appl. No.: 14/511,294

(22) Filed: Oct. 10, 2014

(65) Prior Publication Data

US 2015/0219819 A1 Aug. 6, 2015

Related U.S. Application Data

(60) Provisional application No. 61/934,145, filed on Jan. 31, 2014.

(51) Int. Cl.
| | | |
|---|---|---|
| *G02B 6/24* | (2006.01) | |
| *G02B 6/32* | (2006.01) | |
| *F21V 8/00* | (2006.01) | |
| *C03C 25/10* | (2006.01) | |
| *G02B 6/26* | (2006.01) | |

(52) U.S. Cl.
CPC ........... *G02B 6/0008* (2013.01); *C03C 25/10* (2013.01); *G02B 6/0006* (2013.01); *G02B 6/262* (2013.01); *G02B 6/264* (2013.01); *G02B 6/32* (2013.01)

(58) Field of Classification Search
None
See application file for complete search history.

(56) References Cited

U.S. PATENT DOCUMENTS

| 5,351,168 A | 9/1994 | Easley | |
|---|---|---|---|
| 5,784,508 A * | 7/1998 | Turner | A61B 90/30 385/31 |
| 6,829,411 B2 | 12/2004 | Easley | |
| 8,019,189 B2 * | 9/2011 | Shimotsu | G02B 6/262 372/26 |
| 8,152,798 B2 | 4/2012 | Smith | |

(Continued)

FOREIGN PATENT DOCUMENTS

| DE | 3149616 A1 | 7/1983 |
|---|---|---|
| DE | 3910711 A1 | 10/1990 |
| EP | 1522290 A1 | 4/2005 |

OTHER PUBLICATIONS

Extended European Search Report for EP Application No. 14192478.7; Report dated May 28, 2015 (7 pages).

*Primary Examiner* — Michelle R Connelly
(74) *Attorney, Agent, or Firm* — Cantor Colburn LLP

(57) ABSTRACT

Disclosed herein is an optical fiber assembly comprising a launching fiber having a receiving end and a transmitting end; an illuminating fiber having a receiving end and a transmitting end; where the receiving end of the launching fiber is operative to receive light from a light source and the transmitting end of the launching fiber is operative to transmit light to the receiving end of the illuminating fiber; where the launching fiber contacts the illuminating fiber in a manner so as to be offset from a center of a cross-sectional area of the illuminating fiber; and where the launching fiber has a diameter that is ⅛ to ½ of a diameter of the illuminating fiber; and a lens that is operative to contact the transmitting end of the illuminating fiber.

14 Claims, 11 Drawing Sheets

(56) References Cited

U.S. PATENT DOCUMENTS

| | | | |
|---|---|---|---|
| 2005/0002614 A1* | 1/2005 | Zhong | G02B 6/2835 |
| | | | 385/50 |
| 2005/0105877 A1 | 5/2005 | Nappi et al. | |
| 2007/0086693 A1* | 4/2007 | Murphy | G02B 6/2852 |
| | | | 385/12 |
| 2008/0177257 A1* | 7/2008 | Smith | G02B 6/241 |
| | | | 606/15 |
| 2009/0245303 A1* | 10/2009 | Shimotsu | H01S 3/2383 |
| | | | 372/27 |
| 2010/0191060 A1 | 7/2010 | Shimotsu | |
| 2014/0005483 A1 | 1/2014 | Ohashi et al. | |

* cited by examiner

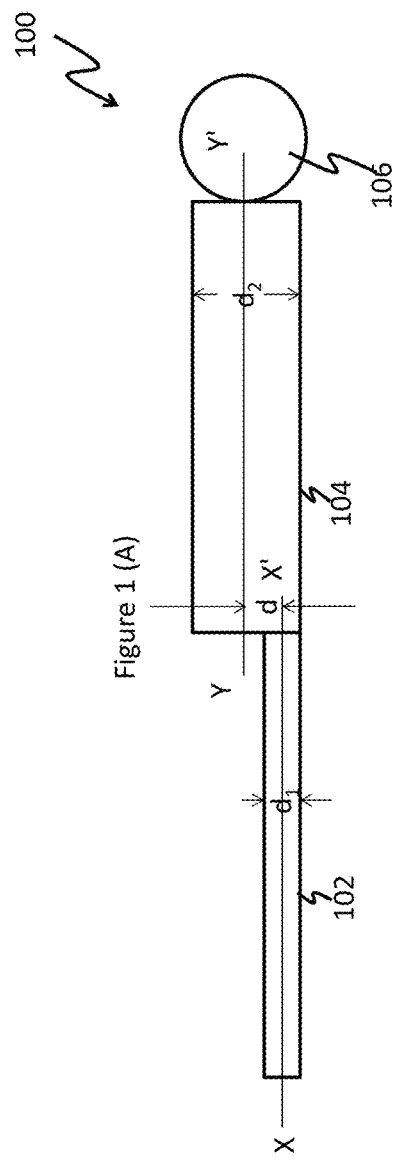
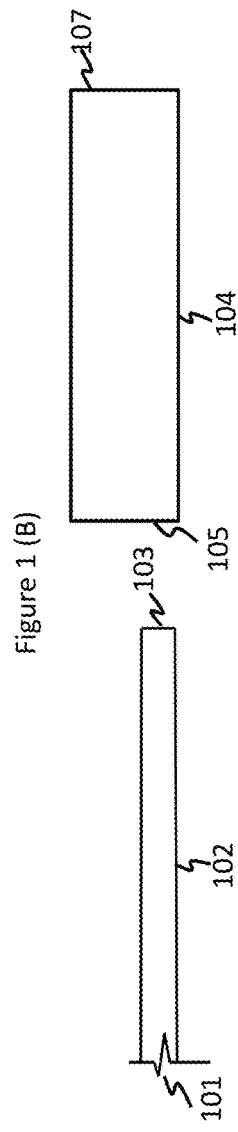
Figure 1 (A)
Figure 1 (B)

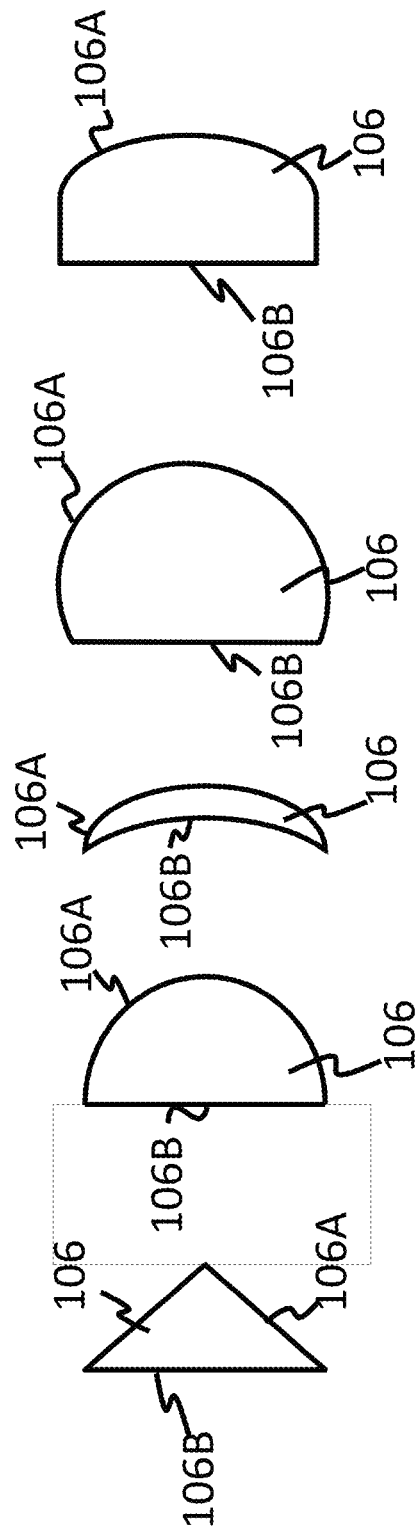

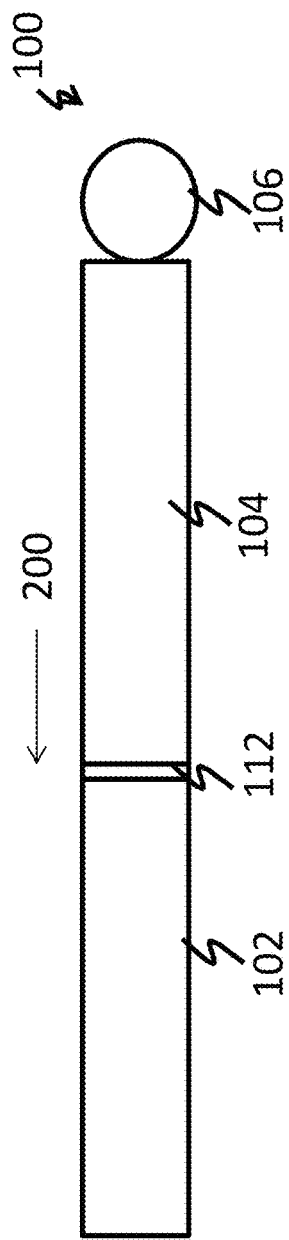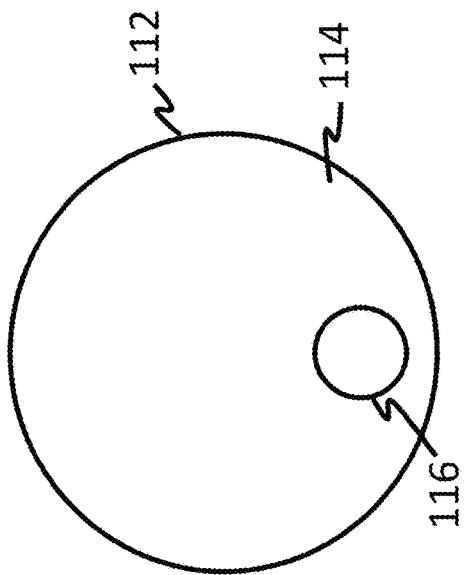
Figure 6(A)
View from the direction 200
Figure 6(B)

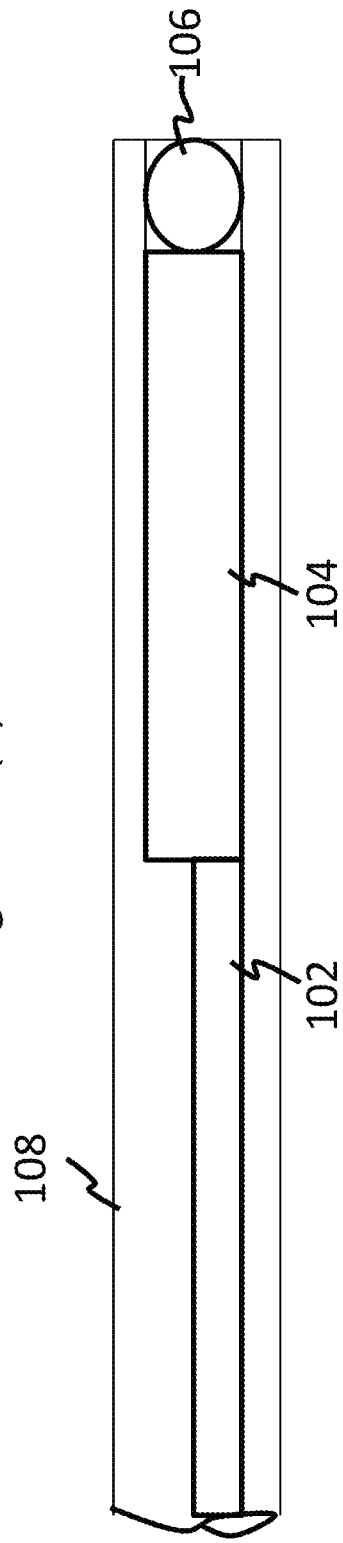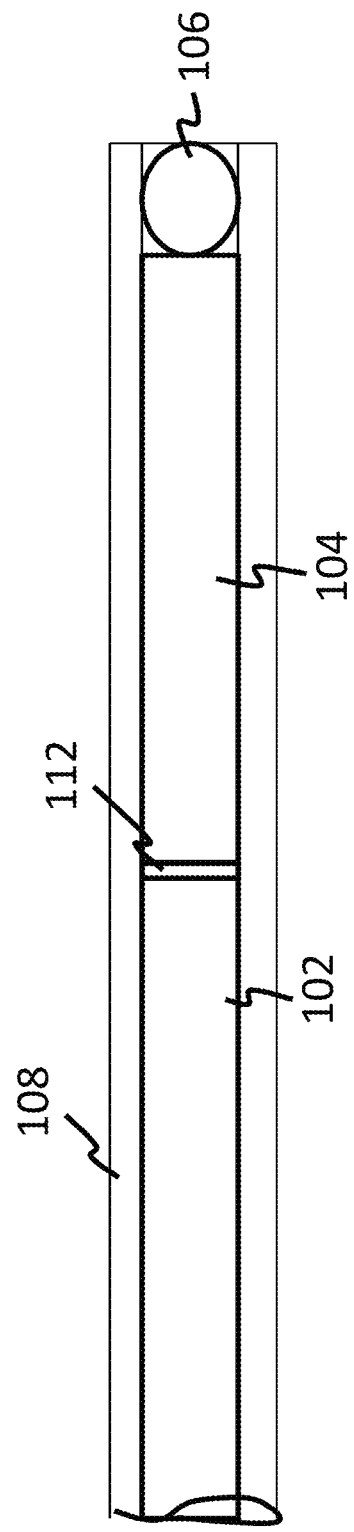

OPTICAL FIBER ASSEMBLY, METHODS OF MANUFACTURE THEREOF AND ARTICLES COMPRISING THE SAME

CROSS-REFERENCE TO RELATED APPLICATIONS

This application claims priority to U.S. Provisional Application No. 61/934,145 filed on Jan. 31, 2014 the entire contents of which are hereby incorporated by reference.

BACKGROUND

This disclosure relates to an optical fiber assembly, to methods of manufacture thereof and to articles comprising the same. In particular, this disclosure relates to an optical fiber assembly with a wide divergence angle and uniform light distribution, to methods of manufacture thereof and to articles comprising the same.

For optical fibers for illumination, the output divergence angle from the fiber is typically limited by its numerical aperture (NA). For example, using a 0.47 numerical aperture step index optical fiber, the full width at half maximum (FWHM) divergence angle is approximately 56 degrees. It is however desirable, to have wider divergence angles for some illumination applications. In the past, a ball lens, a concave or axicon lens was attached to the end of the fiber to increase the maximum divergence angle. However in this configuration, the output distribution is no longer uniform and this non-uniform distribution is undesirable for certain applications. There is therefore a need for obtaining an improved output divergence angle of greater than 56 degrees while at the same time obtaining a uniform light distribution.

SUMMARY

Disclosed herein is an optical fiber assembly comprising a launching fiber having a receiving end and a transmitting end; an illuminating fiber having a receiving end and a transmitting end; where the receiving end of the launching fiber is operative to receive light from a light source and the transmitting end of the launching fiber is operative to transmit light to the receiving end of the illuminating fiber; where the launching fiber contacts the illuminating fiber in a manner so as to be offset from a center of a cross-sectional area of the illuminating fiber; and where the launching fiber has a diameter that is ⅛ to ½ of a diameter of the illuminating fiber; and a lens that is operative to contact the transmitting end of the illuminating fiber; where the optical fiber assembly transmits light received from the light source at a divergence angle of greater than 60 degrees.

Disclosed herein too is an optical fiber assembly comprising a launching fiber having a receiving end and a transmitting end; an illuminating fiber having a receiving end and a transmitting end; a mask disposed between the launching fiber and the receiving fiber; the mask having a diameter that is at least equal to a diameter of the launching fiber; where the mask comprises an opaque section and a transparent section; the transparent section having a circular cross-section that has a diameter that is ⅛ to ½ of a diameter of the illuminating fiber; where the transparent section has a center that is offset from a center of the illuminating fiber; and a lens that is operative to contact the transmitting end of the illuminating fiber; where the optical fiber assembly transmits light received from the light source at a divergence angle of greater than 60 degrees.

Disclosed herein too is a method of manufacturing an article comprising disposing a cladding upon an optical fiber assembly; where the optical fiber assembly comprises a launching fiber having a receiving end and a transmitting end; an illuminating fiber having a receiving end and a transmitting end; where the receiving end of the launching fiber is operative to receive light from a light source and the transmitting end of the launching fiber is operative to transmit light to the receiving end of the illuminating fiber; where the launching fiber contacts the illuminating fiber in a manner so as to be offset from a center of a cross-sectional area of the illuminating fiber; and where the launching fiber has a diameter that is ⅛ to ½ of a diameter of the illuminating fiber; and a lens that is operative to contact the transmitting end of the illuminating fiber; where the optical fiber assembly transmits light received from the light source at a divergence angle of greater than 60 degrees.

Disclosed herein too is a method of using an optical fiber assembly comprising illuminating with electromagnetic radiation an optical fiber assembly comprising a launching fiber having a receiving end and a transmitting end; an illuminating fiber having a receiving end and a transmitting end; where the receiving end of the launching fiber is operative to receive light from a light source and the transmitting end of the launching fiber is operative to transmit light to the receiving end of the illuminating fiber; where the launching fiber contacts the illuminating fiber in a manner so as to be offset from a center of a cross-sectional area of the illuminating fiber; and where the launching fiber has a diameter that is ⅛ to ½ of a diameter of the illuminating fiber; and a lens that is operative to contact the transmitting end of the illuminating fiber; where the optical fiber assembly transmits light received from the light source at a divergence angle of greater than 60 degrees; where the illuminating of the optical fiber assembly takes place at the receiving end of the launching fiber.

BRIEF DESCRIPTION OF THE FIGURES

FIG. 1(A) is a schematic that depicts one exemplary embodiment of the optical fiber assembly that comprises a launching fiber in contact with the illuminating fiber;

FIG. 1(B) is a schematic that depicts the individual optical parts of the optical fiber assembly;

FIGS. 5(A)-5(E) depict a variety of different configurations for lenses that may be used in the optical fiber assembly;

FIG. 6(A) depicts and exemplary embodiment of a mask that is disposed between the launching fiber and the illuminating fiber;

FIG. 6(B) depicts an exemplary embodiment of the mask which comprises an opaque portion and a transparent section through which light from the launching fiber may be transmitted to the illuminating fiber;

FIGS. 10(A) and 10(B) depict exemplary embodiments of assembled optical fiber assemblies.

DETAILED DESCRIPTION

Figure 1C:
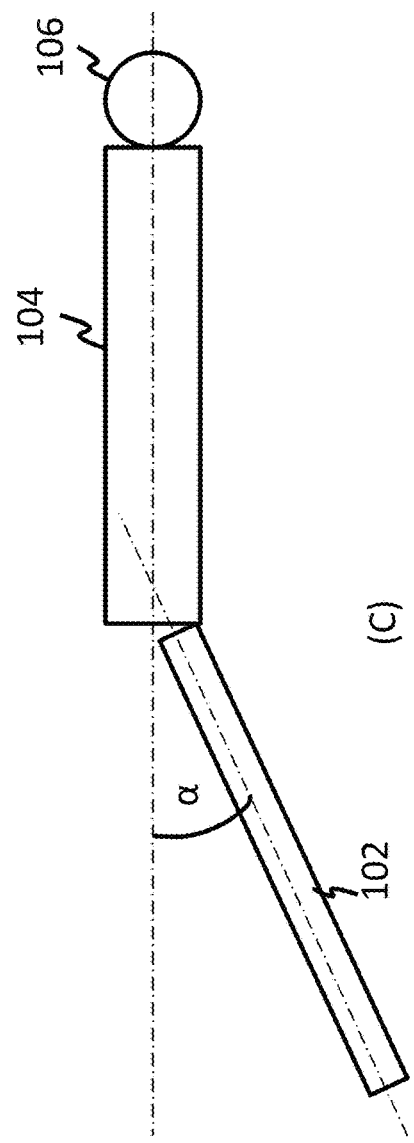
FIG. 1(C) is a schematic that depicts another exemplary embodiment of the optical fiber assembly that comprises a launching fiber in contact with the illuminating fiber.

Disclosed herein is an optical fiber assembly that comprises a launching fiber, an illuminating fiber and a lens. The launching fiber transmits light into the illuminating fiber and into the lens, which then emits the light at a wide divergence angle with a uniform distribution. In one embodiment, the launching fiber has a smaller diameter than the illuminating fiber and uses a restricted mode launching into the illumination fiber. In another embodiment, the launching fiber has a diameter equal to or larger than the illuminating fiber but uses a restricted mode launch into the illumination fiber. The dimensions of the launching fiber (at the point of electromagnetic radiation transmission to the illuminating fiber) relative to the dimensions of the illuminating fiber facilitate the emission of electromagnetic rays from the optical fiber at a wide divergence angle (that is greater than 56 degrees for a numerical aperture of 0.47) with a uniform intensity distribution. Electromagnetic radiation as detailed can include all wavelengths in the electromagnetic spectrum. In a preferable embodiment, the electromagnetic radiation is visible radiation having wavelengths of 300 to 750 nanometers, preferably 390 to 700 nanometers.

FIGS. 1(A) and 1(B) depict one embodiment of the optical fiber assembly 100 that comprises a launching fiber 102 having a diameter $d_1$ in contact with the illuminating fiber 104 having a diameter $d_2$. The illuminating fiber 104 contacts a lens 106 through which light is emitted at a wide divergence angle with a uniform intensity distribution. The launching fiber 102 has a diameter $d_1$ that is smaller than the diameter $d_2$ of the illuminating fiber 104. The diameter $d_1$ of the launching fiber and the diameter $d_2$ of the illuminating fiber 104 both exclude the thickness of cladding that may be disposed on the fiber and represents the core diameter of the fibers respectively.

With reference now to the FIG. 1(b), the launching fiber 102 has a receiving end 101 (where it receives electromagnetic radiation) and a transmitting end 103 (from which the electromagnetic radiation is transmitted to the illuminating fiber). The illuminating fiber 104 has a receiving end 105, where it receives electromagnetic radiation from the transmitting end 103 of the launching fiber 102 and a transmitting end 107 from where it transmits electromagnetic radiation to the lens 106.

The launching fiber 102 contacts the illuminating fiber 104 non-concentrically. In other words, a longitudinal axis X-X' of the launching fiber 102 is always offset from a longitudinal axis Y-Y' of the illuminating fiber 104 by a distance d. The longitudinal axis X-X' of the fiber 102 does not coincide with the longitudinal axis Y-Y' of the illuminating fiber 104 in the optical fiber assembly 100. The launching fiber 102 can contact the illuminating fiber 104 at any point on its surface except where their respective longitudinal axes coincide with one another. The offset distance "d" is ⅛ to ½ of the distance $d_2$.

As seen in the FIG. 1(A), a longitudinal axis of the launching fiber is parallel to a longitudinal axis of the illuminating fiber at a point of contact of the launching fiber with the illuminating fiber. In another embodiment depicted in the FIG. 1(C), a longitudinal axis of the launching fiber is inclined to a longitudinal axis of the illuminating fiber at a point of contact of the launching fiber with the illuminating fiber. In the FIG. 1(C) it may be seen that the launching fiber is inclined at an angle α to the illuminating fiber. The angle α should generally be less than the acceptance angle of the illuminating fiber. In a preferred embodiment, the angle α has a value of 5 to 30 degrees.

Figure 2:
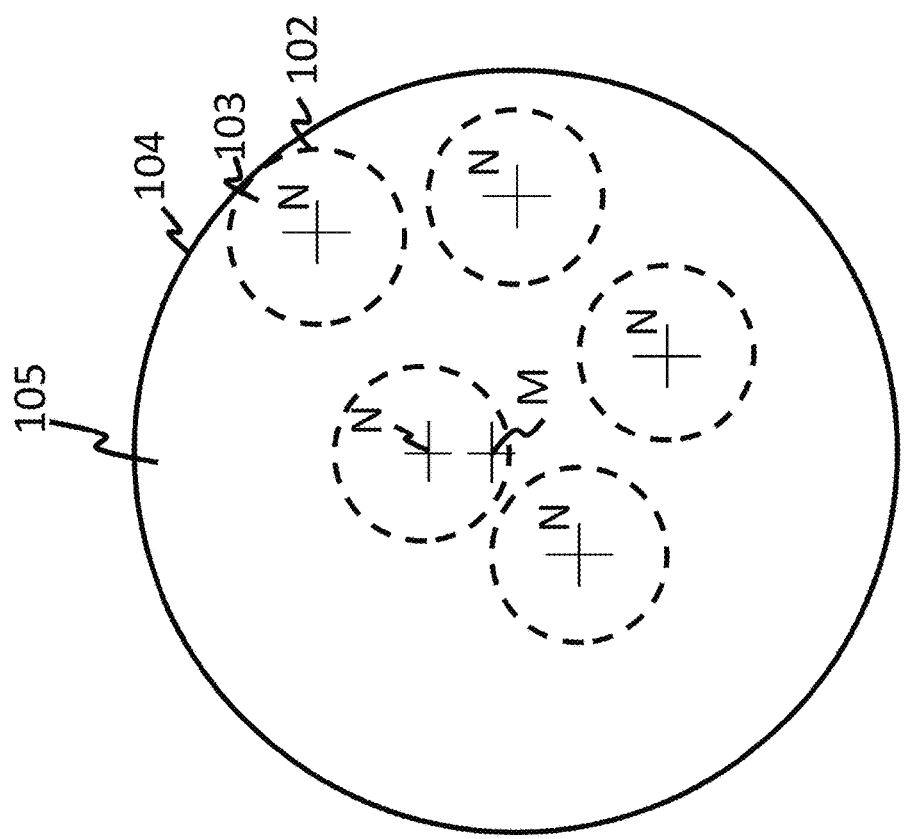
FIG. 2 shows other exemplary positions where the circular transmitting end (shown in dotted lines and having a center N) of a single launching fiber can contact the light receiving end of the illuminating fiber. Alternatively the circular dotted lines can embody locations where a plurality of circular transmitting ends of a plurality of launching fibers can contact the receiving end of the illuminating fiber.

FIG. 2 shows other exemplary positions where the circular transmitting end 103 (shown in dotted lines and having a center N) of a single launching fiber 102 can contact the light receiving end 105 of the illuminating fiber 104 (represented by the solid line and having a center M). The dotted lines represent the various positions that a single launching fiber 102 can contact the illuminating fiber 104. As can be seen in the FIG. 2, the launching fiber 102 can contact the illuminating fiber such that a portion of its outer periphery or circumference contacts the outer periphery or circumference of the illuminating fiber 104. In another embodiment, the launching fiber 102 can contact the illuminating fiber such that the center M and N (of the illuminating fiber and the launching fiber respectively) can lie within the area represented by the circular transmitting end 103 of the launching fiber so long as these centers do not coincide with one another.

In a preferred embodiment, the launching fiber 102 contacts the illuminating fiber 104 in a manner such that at least one tangent to the outer circumference of the launching fiber 102 coincides with at least one tangent to the outer circumference of the illuminating fiber 104. In short, at least a portion of the outer circumference of the launching fiber 102 coincides with a portion of the outer circumference of the illuminating fiber 104.

Figure 3:
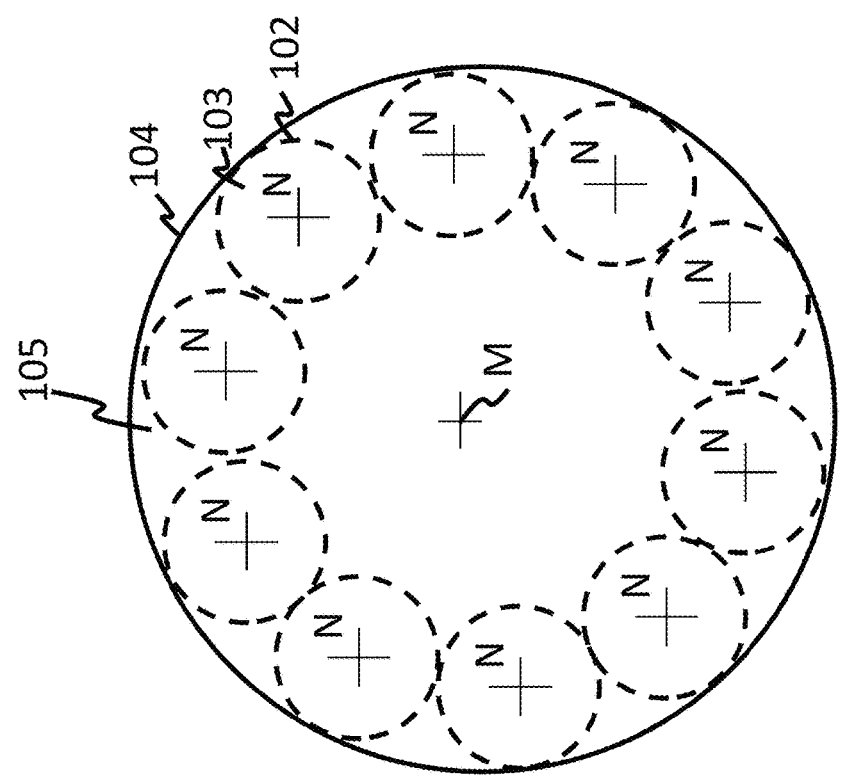
FIG. 3 shows one embodiment where a plurality of launching fibers are arranged to contact the cross-sectional area of the receiving end of the illuminating fiber.

In another embodiment, a plurality of launching fibers 102 may be periodically or aperiodically arranged within the periphery of the receiving end (i.e., within the cross-sectional area of the receiving end) of the illuminating fiber 104. FIG. 3 shows one embodiment where a plurality of launching fibers 102 are arranged within the cross-sectional area of the receiving end of the illuminating fiber 104. As may be seen in the FIG. 3, the launching fibers 102 have a fixed periodicity between them. The launching fibers 102 may also be arranged to randomly (such that there is no periodicity between them) contact the cross-sectional area of the receiving end of the illuminating fiber 104. The FIG. 2 can be alternatively viewed as a fiber assembly 100 where 5 launching fibers 102 are randomly arranged to contact a single illuminating fiber 104.

In another embodiment (not shown), the fiber assembly 100 may comprise a plurality of launching fibers 102 where each launching fiber may have a different diameter. For example, a first launching fiber 102 having a diameter $d_2$, a second launching fiber $d_3$ and a third launching fiber $d_4$ (where $d_2$ is greater than $d_3$, which is greater than $d_4$) can each contact a single illuminating fiber to emit light at a wide divergence angle with a uniform distribution.

It is desirable for the launching fibers 102 to have an outer core diameter $d_2$ of ⅛ to ½, of the diameter of the illuminating fiber 104. In another embodiment, the launching fibers 102 have an outer core diameter $d_2$ of ⅙ to ⅓ of the diameter of the illuminating fiber 104. It is also desirable for the launching fiber to have a numerical aperture that is smaller than the numerical aperture of the illuminating fiber. In one embodiment, the numerical aperture of the launching fiber is 0.12 to 0.20 at a wavelength of 850 nanometers. In another embodiment, the numerical aperture of the launching fiber is 0.14 to 0.18 at a wavelength of 850 nanometers.

The length of the launching fiber is long enough to reduce any speckles. The length of the launching fiber is $L_c/(NA)2$, where $L_c$ is the coherence length of the light source and where NA is the numerical aperture of the launching fiber 102.

The illuminating fiber 104 can be any fiber that is used for the transmission of electromagnetic radiation.

The lens 106 can be a ball lens, a concave or axicon lens or a hemispherical lens. Any suitable size of the lens may be used to divert the output from the illumination fiber. In an embodiment, a suitable diameter of the lens is approximately the same to twice the diameter of the core of the illumination optical fiber. In another embodiment, the lens is ball lens having a diameter of approximately 500 micrometers or less. Any suitable method may be used to attach the lens to the end portion of the illumination optical fiber. For example, the end portion of the illumination fiber and the ball lens may be inserted into a tube such as a glass tube as shown in FIG. 4.

Figure 4:
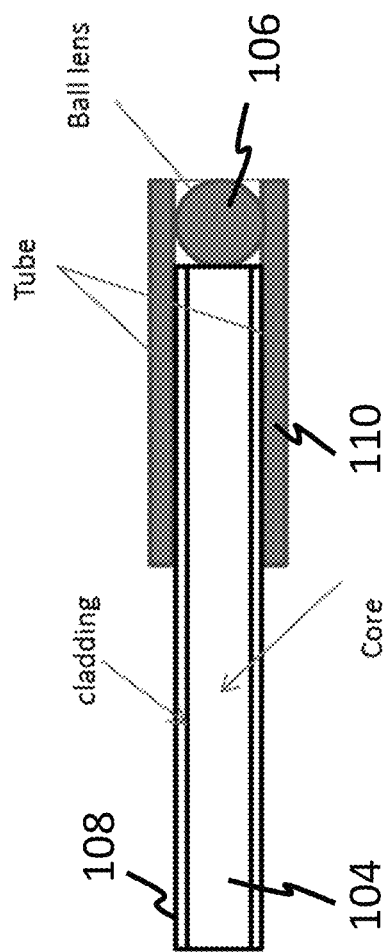
FIG. 4 is a schematic of an exemplary embodiment depicting one method of facilitating contact between the transmitting end of the illuminating fiber and the ball lens.

With reference now to the FIG. 4, it may be seen that the illuminating fiber 104 contacts a ball lens 106 at the transmitting end of the illuminating fiber 104. The illuminating fiber 104 has a cladding 108 disposed upon it. A tube 110 contacts the cladding 108 as well as the ball lens 106 and secures the ball lens 106 in such a manner as to continuously contact the illuminating fiber 104. The tube 110 may comprise a glass, a ceramic, a metal or a polymer. In an exemplary embodiment, the tube 110 may comprise an elastomer. An elastomer permits the lens 106 to be replaced as desired (with larger or smaller lens if desired).

In addition to ball lens, concave or axicon lens, there are a variety of other lens that may be used. FIGS. 5(A)-5(E) depict a variety of different configurations for lenses 106 that may be used in the optical fiber assembly 100. The lens 106 have a first surface 106B (that preferably receives the electromagnetic radiation) and a second surface 106A (that preferably transmits the electromagnetic radiation). In one embodiment, the first surface 106B contacts the illuminating fiber at the transmitting end. While the aforementioned configurations state that the first surface 106B contacts the transmitting end of the illuminating fiber, there may be instances where the second surface 106A is the receiving surface for the electromagnetic radiation and in this case the first surface 106B acts as the transmitting surface of the lens. FIG. 5(A) depicts a triangular lens, FIG. 5(B) represents a hemispherical lens, FIG. 5(C) represents a crescent shaped lens, FIG. 5(D) represents a lens having ¾ the area of a circular lens and the FIG. 5(E) represents a lens having a D-shape. The curved face 106A of the D-shaped lens may range from elliptical surface to a circular surface. In other words, the locus of points that define the surface 106A of the lens of the FIG. 5(E) may be a part of a circle or part of an ellipse.

As noted above, in one configuration, the launching fiber may have a diameter that is equal to the diameter of the illuminating fiber and yet transmit electromagnetic radiation in restricted modes to the illuminating fiber from the launching fiber. An example of this configuration is displayed in the FIG. 6(A). In the FIG. 6(A), a mask 112 is disposed between the launching fiber 102 and the illuminating fiber 104. When viewed from the direction 200 of the FIG. 6(A), the mask 112 as seen in the FIG. 6(B) comprises an opaque portion 114 and a transparent section 116 through which light from the launching fiber 102 may be transmitted to the illuminating fiber 104. A lens 106 contacts the transmitting end of the illuminating fiber 104. The mask 112 has a circular cross-sectional area whose diameter is greater than or equal to the diameter of the launching fiber. Its diameter is also greater than or equal to the diameter of the illuminating fiber.

The mask 112 contacts the transmitting end of the launching fiber and the receiving end of the illuminating fiber. In one embodiment, the transparent section 116 has a circular cross-sectional area whose diameter is ⅛ to ½, preferably ⅙ to ⅓ of the diameter of the illuminating fiber 104. The transparent section 116 is always offset from the center of the illuminating fiber 104. The center point of the transparent section 116 never coincides with the center of the cross-sectional area of the illuminating fiber 104. In an embodiment, the center of the transparent section 116 is offset from the center of the illuminating fiber 104 by a distance that is ⅛ to ½ of the diameter of the illuminating fiber 104.

The transparent section 116 may comprise air, a transparent section having the same refractive index as that of the launching fiber or the illuminating fiber or having a refractive index that is greater than that of the launching fiber but less than that of the illuminating fiber.

Figure 7B:
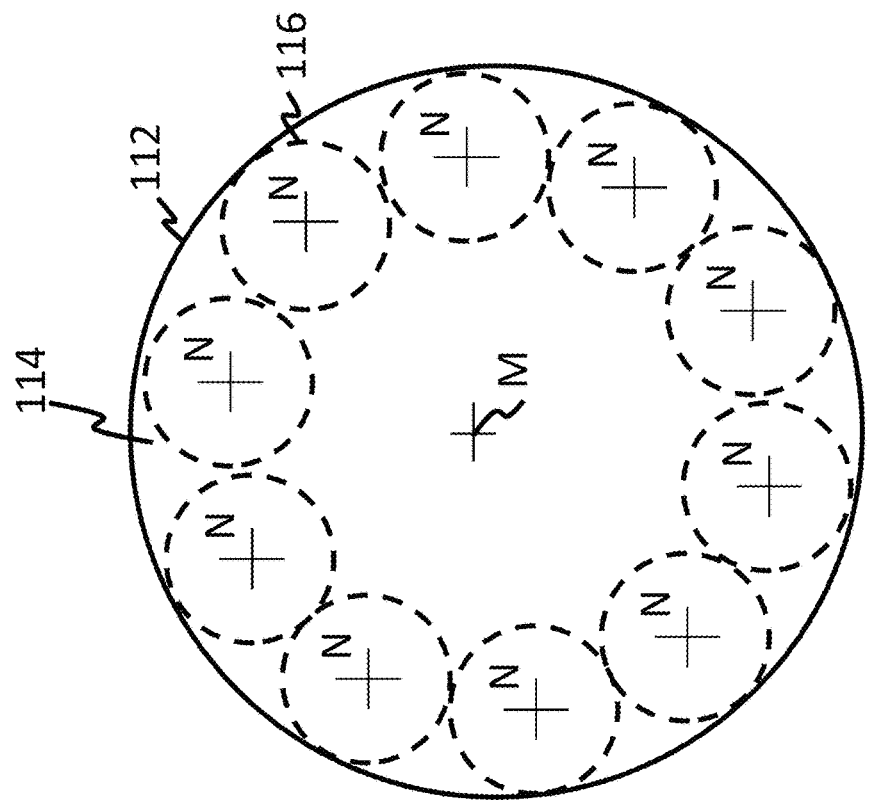
FIGS. 7(A) and 7(B) depict exemplary configurations for the locations of the transparent sections of the mask.
Figure 7A:
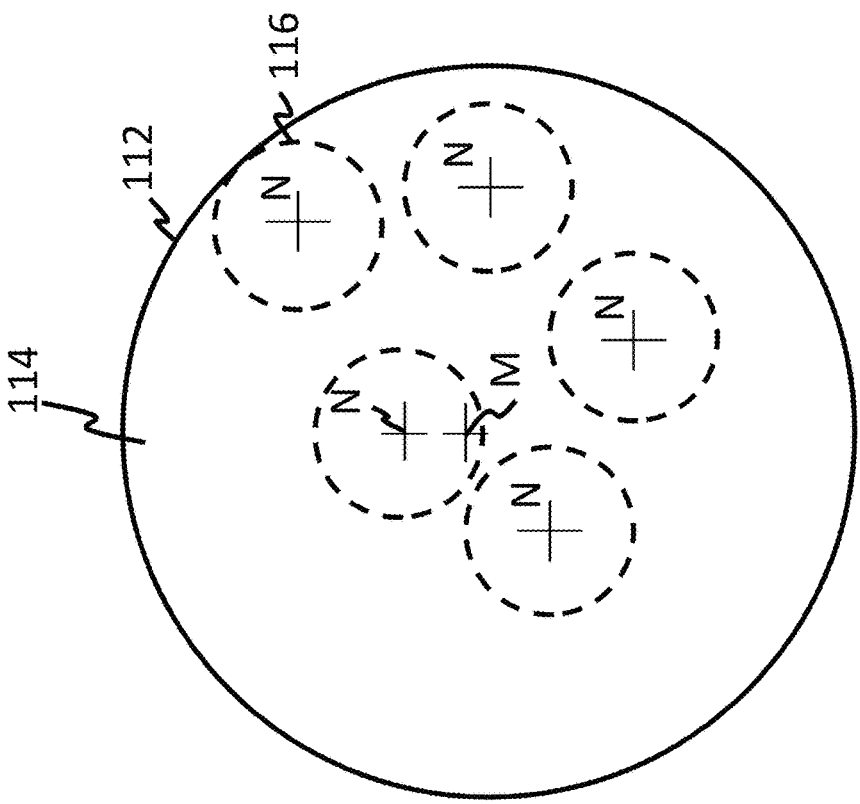

The mask 112 may have more than one transparent section 116 as seen in the FIGS. 7(A) and 7(B). In one embodiment, the mask may have a plurality of transparent sections each of which are offset from the center of the illuminating fiber. The FIGS. 7(A) and 7(B) are replicas of the FIGS. 2 and 3 respectively. In short, the transparent section 116 of the mask 112 can be located at the same positions that the launching fiber 102 contacts the illuminating fiber 104 as depicted in the FIGS. 2 and 3 respectively.

Figure 8:
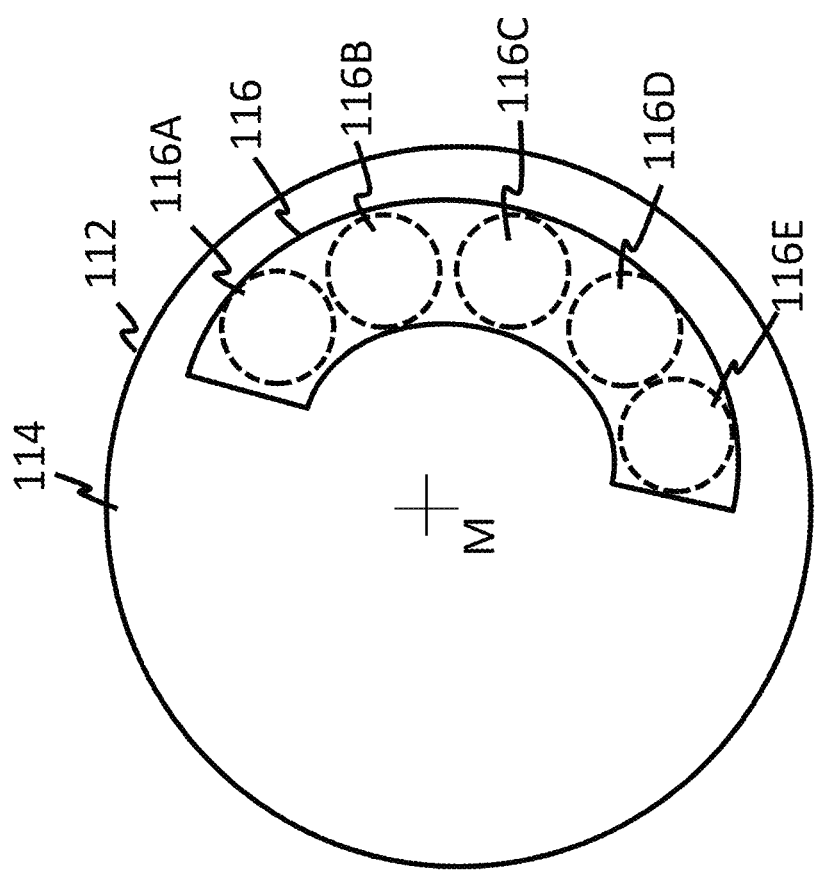
FIG. 8 shows the transparent section of the mask as a semi-circular slot that results from the combination of several adjacent circular transparent sections.
Figure 9:
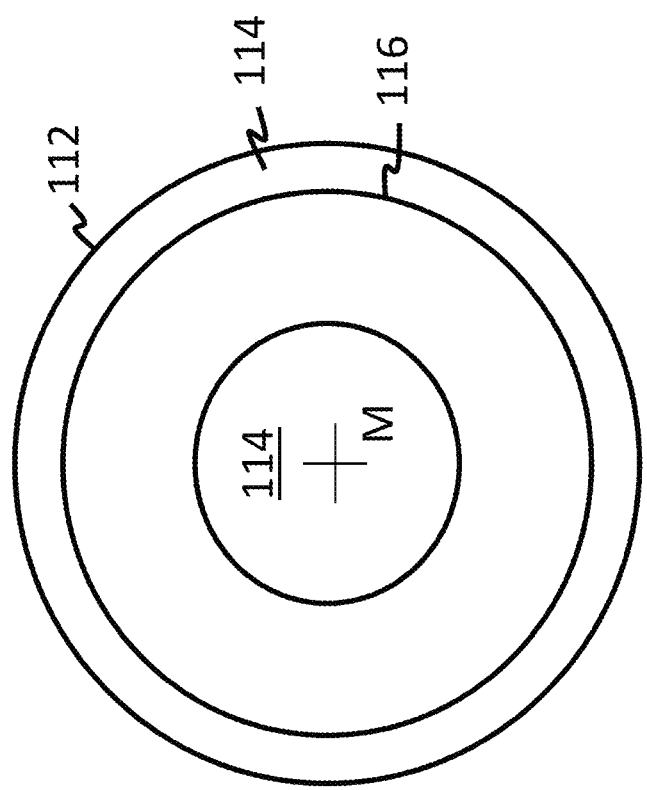
FIG. 9 depicts an exemplary embodiment of a circular transparent section in the mask.

In one embodiment, some of the plurality of transparent sections 116 (as seen in the FIG. 7(B)) can be combined to form a slot through which light can enter from the launching fiber and be transmitted to the illuminating fiber. This is depicted in the FIG. 8 which shows the transparent section 116 as a semi-circular slot that results from the combination of several adjacent circular transparent sections 116A, 116B, 116C, 116D and 116E. The slots can be distributed in different portions of the mask 112 (not shown). The slot can also be circular (i.e., it can be parallel to the entire outer circumference of the illuminating fiber 104 as can be seen in the FIG. 9.

The mask 112 can be manufactured from any material that is opaque and a section may then be drilled or etched therethrough to create the transparent section 116. The mask 112 may comprise a metal, a ceramic or a polymer. In an exemplary embodiment, a block copolymer having spherical domains may be etched and used as the mask 112.

The optical fiber assembly may be illuminated by a laser. Suitable lasers are diode lasers, frequency double solid state lasers or gas lasers.

The FIGS. 10(A) and 10(B) depict the entire optical fiber assembly with cladding disposed thereon. With reference now to the FIGS. 10(A) and 10(B), in one embodiment, in one method of manufacturing the optical fiber assembly 100, a cladding 108 is disposed so as to contact the launching fiber 102, the mask 112 if present, and the illuminating fiber 104. The lens 106 can also be disposed into the cladding if desired.

In another embodiment, previous detailed in the FIG. 4, a separate tube 110 may be disposed on the cladding 108 to contact the lens and to hold it in position. The cladding may be disposed on the respective fibers by extrusion. In an exemplary embodiment, crosshead extrusion may be used to dispose the cladding on the launching fibers and the illuminating fibers.

The cladding is generally manufactured from a polymer that has a refractive index that is lower than that of the launching and illuminating fibers. In an exemplary embodiment, the cladding comprises ethylene tetrafluoroethylene, (ETFE), a fluorine based plastic, while the illuminating and launching fiber each comprise silica.

The dimensions of the launching fiber (at the point of electromagnetic radiation transmission to the illuminating fiber) relative to the dimensions of the illuminating fiber facilitate the emission of electromagnetic rays from the optical fiber at a wide divergence angle (that is greater than 60 degrees, preferably greater than 65 degrees and more preferably greater than 70 degrees for a numerical aperture of 0.47) with a uniform intensity distribution. The optical fiber assembly is advantageous in that its divergence angle exceeds the full width at half maximum of the divergence angle of the illumination fiber illuminated and measured under the same conditions with the same type and size of lens.

It is to be noted that all ranges detailed herein include the endpoints. Numerical values from different ranges are combinable.

The transition term comprising encompasses the transition terms "consisting of" and "consisting essentially of".

The term "and/or" includes both "and" as well as "or". For example, "A and/or B" is interpreted to be A, B, or A and B.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An optical fiber assembly comprising:
a launching fiber having a receiving end and a transmitting end;
an illuminating fiber having a receiving end and a transmitting end; where the receiving end of the launching fiber is operative to receive light from a light source and the transmitting end of the launching fiber is operative to transmit light to the receiving end of the illuminating fiber; where the launching fiber contacts the illuminating fiber in a manner so as to be offset from a center of a cross-sectional area of the illuminating fiber; and where the launching fiber has a diameter that is ⅛ to ½ of a diameter of the illuminating fiber; and
a lens that is operative to contact the transmitting end of the illuminating fiber; where the optical fiber assembly transmits light received from the light source at a divergence angle of greater than 60 degrees; where the launching fiber has a length of $Lc/(NA)^2$, where Lc is the coherence length of the light source and where NA is the numerical aperture of the single launching fiber.

2. The optical fiber assembly of claim 1, where the launching fiber has a numerical aperture of 0.12 to 0.20 at a wavelength of 850 nm.

3. The optical fiber assembly of claim 1, where the launching fiber has a diameter that is ⅙ to ⅓ of the diameter of the illuminating fiber.

4. The optical fiber assembly of claim 1, where the divergence angle exceeds the full width at half maximum of the divergence angle of the illumination fiber measured under the same conditions.

5. The optical fiber assembly of claim 1, where the optical fiber assembly transmits light received from the light source at a divergence angle of greater than 60 degrees and where an intensity distribution is uniform across the entire divergence angle.

6. The optical fiber assembly of claim 1, where the launching fiber and the illuminating fiber each comprise a silica core.

7. The optical fiber assembly of claim 1, wherein a tangent to an outer circumference of the launching fiber coincides with a tangent to an outer circumference of the illuminating fiber.

8. The optical fiber assembly of claim 1, wherein a longitudinal axis of the single launching fiber is parallel to a longitudinal axis of the illuminating fiber at a point of contact of the launching fiber with the illuminating fiber.

9. The optical fiber assembly of claim 1, wherein a longitudinal axis of the launching fiber is inclined to a longitudinal axis of the illuminating fiber at a point of contact of the launching fiber with the illuminating fiber.

10. The optical fiber assembly of claim 9, wherein an angle of inclination between the longitudinal axis of the launching fiber and the longitudinal axis of the illuminating fiber is less than an angle of acceptance of the illuminating fiber.

11. The optical fiber assembly of claim 1, wherein the lens is a ball lens, a concave lens or an axicon lens.

12. A method of manufacturing an article comprising:
disposing a cladding upon an optical fiber assembly; where the optical fiber assembly comprises:
a launching fiber having a receiving end and a transmitting end;
an illuminating fiber having a receiving end and a transmitting end; where the receiving end of the launching fiber is operative to receive light from a light source and the transmitting end of the launching fiber is operative to transmit light to the receiving end of the illuminating fiber; where the launching fiber contacts the illuminating fiber in a manner so as to be offset from a center of a cross-sectional area of the illuminating fiber; and where the launching fiber has a diameter that is ⅛ to ½ of a diameter of the illuminating fiber; and
a lens that is operative to contact the transmitting end of the illuminating fiber; where the optical fiber assembly transmits light received from the light source at a divergence angle of greater than 60 degrees; where the launching fiber has a length of $Lc/(NA)^2$, where Lc is the coherence length of the light source and where NA is the numerical aperture of the single launching fiber.

13. A method of using an optical fiber assembly comprising:
illuminating with electromagnetic radiation an optical fiber assembly comprising:
a launching fiber having a receiving end and a transmitting end;

an illuminating fiber having a receiving end and a transmitting end; where the receiving end of the launching fiber is operative to receive light from a light source and the transmitting end of the launching fiber is operative to transmit light to the receiving end of the illuminating fiber; where the launching fiber contacts the illuminating fiber in a manner so as to be offset from a center of a cross-sectional area of the illuminating fiber; and where the launching fiber has a diameter that is $\frac{1}{8}$ to $\frac{1}{2}$ of a diameter of the illuminating fiber; and a lens that is operative to contact the transmitting end of the illuminating fiber; where the optical fiber assembly transmits light received from the light source at a divergence angle of greater than 60 degrees; where the illuminating of the optical fiber assembly takes place at the receiving end of the launching fiber; where the launching fiber has a length of $Lc/(NA)^2$ where Lc is the coherence length of the light source and where NA is the numerical aperture of the single launching fiber.

14. The method of claim 13, where the electromagnetic radiation is visible light obtained from a laser source.

\* \* \* \* \*